United States Patent
Zhong et al.

(10) Patent No.: US 10,908,799 B2
(45) Date of Patent: Feb. 2, 2021

(54) METHOD AND A DEVICE FOR CONTROLLING A MOVING OBJECT, AND A MOBILE APPARATUS

(71) Applicant: SZ DJI TECHNOLOGY CO., LTD., Shenzhen (CN)

(72) Inventors: Heli Zhong, Shenzhen (CN); Zhiyuan Zhang, Shenzhen (CN); Weifeng Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 235 days.

(21) Appl. No.: 15/592,261

(22) Filed: May 11, 2017

(65) Prior Publication Data

US 2017/0242578 A1    Aug. 24, 2017

Related U.S. Application Data

(63) Continuation of application No. PCT/CN2014/091162, filed on Nov. 14, 2014.

(51) Int. Cl.
| | |
|---|---|
| *G06F 3/0484* | (2013.01) |
| *G06F 3/0486* | (2013.01) |
| *G06F 3/0488* | (2013.01) |
| *G06F 3/041* | (2006.01) |
| *G06F 3/0481* | (2013.01) |

(52) U.S. Cl.
CPC .......... *G06F 3/04847* (2013.01); *G06F 3/041* (2013.01); *G06F 3/0486* (2013.01); *G06F 3/04817* (2013.01); *G06F 3/04883* (2013.01)

(58) Field of Classification Search
CPC ... G05D 1/0011; G06F 3/041; G06F 3/04817; G06F 3/04847; G06F 3/0486; G06F 3/04883

See application file for complete search history.

(56) References Cited

U.S. PATENT DOCUMENTS

| | | | |
|---|---|---|---|
| 2008/0183484 A1* | 7/2008 | Kondo | G05B 23/0216 705/1.1 |
| 2012/0191269 A1* | 7/2012 | Chen | G05D 1/0016 701/2 |

(Continued)

FOREIGN PATENT DOCUMENTS

| | | |
|---|---|---|
| CN | 1955901 A | 5/2007 |
| CN | 101582990 A | 11/2009 |

(Continued)

OTHER PUBLICATIONS

The World Intellectual Property Organization (WIPO) International Search Report for PCT/CN2014/091162 dated Mar. 30, 2015 5 Pages.

*Primary Examiner* — Jennifer N To
*Assistant Examiner* — Reji Kartholy
(74) *Attorney, Agent, or Firm* — Anova Law Group, PLLC

(57) ABSTRACT

A method and a device for controlling a moving object and a mobile apparatus are provided. The method comprises detecting a contact operation on a touch display, detecting, if the detected contact operation is a sliding contact operation in a preset image region, whether the sliding contact operation is a control trigger operation for the moving object, and, if yes, generating a control instruction for the moving object.

15 Claims, 9 Drawing Sheets

(56) References Cited

U.S. PATENT DOCUMENTS

| | | | | |
|---|---|---|---|---|
| 2013/0030750 A1* | 1/2013 | Kim | ................... | G06N 3/004 |
| | | | | 702/108 |
| 2013/0338856 A1* | 12/2013 | Yelland | ............... | G05D 1/0088 |
| | | | | 701/2 |
| 2014/0008496 A1 | 1/2014 | Ye et al. | | |
| 2014/0317532 A1* | 10/2014 | Ma | ................... | H04N 7/152 |
| | | | | 715/753 |
| 2015/0142211 A1* | 5/2015 | Shehata | ............... | H04N 7/181 |
| | | | | 701/2 |

FOREIGN PATENT DOCUMENTS

| | | | |
|---|---|---|---|
| CN | 102346662 | A | 2/2012 |
| CN | 102510687 | A | 6/2012 |
| CN | 102789327 | A * | 11/2012 |
| CN | 102789327 | A | 11/2012 |
| CN | 202569564 | U | 12/2012 |
| CN | 103186334 | A | 7/2013 |
| JP | 10326172 | A | 12/1998 |
| JP | 2007106269 | A | 4/2007 |
| JP | 2009521753 | A | 6/2009 |
| JP | 2011037426 | A | 2/2011 |
| JP | 2011251678 | A | 12/2011 |
| JP | 2014031118 | A | 2/2014 |
| JP | 2014042507 | A | 3/2014 |
| JP | 2014506368 | A | 3/2014 |

\* cited by examiner

US 10,908,799 B2

METHOD AND A DEVICE FOR CONTROLLING A MOVING OBJECT, AND A MOBILE APPARATUS

CROSS-REFERENCE TO RELATED APPLICATION

This application is a continuation of International Application No. PCT/CN2014/091162, filed on Nov. 14, 2014, which is hereby incorporated by reference in its entirety.

TECHNICAL FIELD

The present disclosure relates to the field of control technology, particularly to a method and a device for controlling a moving object as well as a mobile apparatus.

BACKGROUND

A controlling system for an unmanned aerial vehicle (UAV), a remote control car, a remote control robot, or the like, may generally comprise a remote controller and a corresponding signal receiving and processing device. The remote controller may generally comprise a conventional stick controller or a smart mobile apparatus, such as a smartphone, a tablet computer, and so on, that has a respective application installed and configured thereon.

With the smart mobile apparatus, a user may generate controls for the UAV, the remote control car, the remote control robot, or the like, by controlling a movement of the smart mobile apparatus or clicking on an application button displayed on the smart mobile apparatus.

However, with existing methods for controlling the smart mobile apparatus, the user may unintentionally click on a related application button or operate a mobile smart terminal to move, causing misoperations that may result in accidents, thus bringing losses to the user.

SUMMARY

The embodiments of the present disclosure provide a method and a device for controlling a moving object, and a mobile apparatus, with which the occurrence of a control misoperation can be minimized.

In one aspect, the present disclosure provides a method for controlling a moving object comprising detecting a contact operation on a touch display, detecting, if the contact operation is a sliding contact operation in a preset image region, whether the sliding contact operation is a control trigger operation for the moving object, and generating, if the sliding contact operation is the control trigger operation, a control instruction for the moving object.

In some embodiments, the preset image region is a human-machine interactive interface including a sliding indication region configured to indicate a sliding path and an interactive sliding icon configured to move dynamically in the sliding indication region.

In some embodiments, detecting whether the sliding contact operation is the control trigger operation for the moving object comprises judging whether the sliding contact operation in the preset image region meets a preset control trigger condition and determining that the sliding contact operation is the control trigger operation for the moving object if the sliding contact operation meets the preset control trigger condition.

In some embodiments, judging whether the sliding contact operation in the preset image region meets the preset control trigger condition comprises judging whether the sliding contact operation in the preset image region is a continuous sliding operation in the preset image region and, if yes, judging that the sliding contact operation meets the preset control trigger condition.

In some embodiments, judging whether the sliding contact operation in the preset image region meets the preset control trigger condition comprises judging whether the sliding contact operation in the preset image region is an operation of sliding the interactive sliding icon included in the preset image region in a sliding path region included in the preset image region and, if yes, judging that the sliding contact operation meets the preset control trigger condition.

In some embodiments, judging whether the sliding contact operation in the preset image region meets the preset control trigger condition comprises judging whether the sliding contact operation in the preset image region is an operation of moving the interactive sliding icon included in the preset image region in a sliding path region included in the preset image region along a predefined direction and, if yes, judging that the sliding contact operation meets the preset control trigger condition.

In some embodiments, judging whether the sliding contact operation in the preset image region meets the preset control trigger condition comprises judging whether the sliding contact operation in the preset control trigger condition is an operation of moving the interactive sliding icon included in the preset image region in a sliding path region included in the preset image region by a moving distance, with a ratio of the moving distance to a length of the sliding path region reaching a preset ratio threshold, and if yes, judging that the sliding contact operation meets the preset control trigger condition.

In some embodiments, the method further comprises, prior to detecting the contact operation on the touch display, displaying the preset image region when a display instruction related to the preset image region is received.

In some embodiments, the method fluffier comprises, prior to displaying the preset image region, receiving the display instruction related to the preset image region. The display instruction comprises an instruction for requesting the moving object to move, an instruction for requesting the moving object to stop, or an instruction for requesting, the moving object to return to a preset position point.

In some embodiments, the method further comprises, prior to displaying the preset image region, receiving the display instruction related to the preset image region. The display instruction comprises an instruction for requesting the moving object to take off, an instruction for requesting the moving object to land, or an instruction for requesting the moving object to return to a preset point of return.

In some embodiments, the method further comprises controlling to start a self-checking process for the moving object if the contact operation is the sliding contact operation in the preset image region and stopping detecting whether the sliding contact operation is the control trigger operation if error information detected by the moving object is received.

In some embodiments, the method further comprises displaying information on progress of the self-checking process according to information associated with the sliding contact operation in the preset image region.

In some embodiments, the information associated with the sliding contact operation in the preset image region comprises at least one of information on a duration of a sliding in the preset image region or information on a moving distance.

In some embodiments, the method further comprises controlling to stop the self-checking process for the moving object if it is detected that the sliding contact operation is not the control trigger operation.

In another aspect, the present disclosure provides a device for controlling a moving object comprising a detecting module configured to detect a contact operation in a touch display, a judging module configured to, if the contact operation is a sliding contact operation in a preset image region, detect whether the sliding co tact operation is a control trigger operation for the moving object, and a control module configured to generate a control instruction for the moving object if a judging result of the judging module is yes.

In some embodiments, the preset image region is a human-machine interactive interface including a sliding indication region configured to indicate a sliding path and an interactive sliding icon configured to move dynamically in the sliding indication region.

In some embodiments, the judging module comprises a judging unit configured to judge whether the sliding contact operation in the preset image region meets a preset control trigger condition and a determining unit configured to determine that the sliding contact operation is the control trigger operation for the moving object if the judging unit judges that the sliding contact operation meets the preset control trigger condition.

In some embodiments, the judging unit is further configured to judge whether the sliding contact operation in the preset image region is a continuous sliding operation in the preset image region and, if yes, to judge that the sliding contact operation meets the preset control trigger condition.

In some embodiments, the judging unit, is further configured to judge whether the sliding contact operation in the preset image region is an operation of sliding the interactive sliding icon in the preset image region in a sliding path region included in the preset image region and, if yes, to judge that the sliding contact operation meets the preset control trigger condition.

In some embodiments, the judging unit is further configured to judge whether the sliding contact operation in the preset image region is an operation of moving the interactive sliding icon included in the preset image region in a sliding path region included in the preset image region along a predefined direction and, if yes, to judge that the sliding contact operation meets the preset control trigger condition.

In some embodiments, the judging unit is further configured to judge whether the sliding contact operation in the preset image region is an operation of moving the interactive sliding icon included in the preset image region in a sliding path region included in the preset image region by a moving distance, with a ratio of the moving distance to a length of the sliding path region reaching a preset ratio threshold, and, if yes, to judge that the sliding contact operation meets the preset control trigger condition.

In some embodiments, the device further comprises a display module configured to display the preset image region when a display instruction related to the image region is received.

In some embodiments, the device further comprises a receiving module configured to receive the display instruction related to the preset image region. The display instruction comprises an instruction for requesting the moving object to move, an instruction for requesting the moving object to stop, or an instruction for requesting the moving object to return to a preset position point.

In some embodiments, the device further comprises a receiving module configured to receive the display instruction related to the preset image region. The display instruction comprises an instruction for requesting the moving object to take off, or an instruction for requesting the moving object to land, or an instruction for requesting the moving object to return to a preset point of return.

In some embodiments, the device further comprises a self-checking module configured to control to start a self-checking process for the moving object if the detected contact operation is the sliding contact operation in the preset image region and notify to stop detecting whether the sliding contact operation is the control trigger operation if error information detected by the moving object is received.

In some embodiments, the self-checking module is further configured to control to display information on progress of the self-checking process according to information associated with the sliding contact operation in the preset image region.

In some embodiments, the judging module is further configured to control to stop the self-checking process for the moving object if it is detected that the sliding contact operation is not the control trigger operation.

In another aspect, the present disclosure provides a mobile apparatus comprising a touch display and a processor configured, to detect a contact operation on the touch display, detect, if the contact operation is a sliding contact operation in a preset image region, whether the sliding contact operation is a control trigger operation for a moving object, and generate, if the sliding contact operation is the control trigger operation, a control instruction for the moving object.

In some embodiments, the preset image region is a human-machine interactive interface including a sliding indication region configured to indicate a sliding path and an interactive sliding icon configured to move dynamically in the sliding indication region.

In some embodiments, the processor is further configured to judge whether the sliding contact operation in the preset image region meets a preset control trigger condition and determine that the sliding contact operation is the control trigger operation for the moving object if the sliding contact operation meets the preset control trigger condition.

In some embodiments, the processor is further configured to judge whether the sliding contact operation in the preset image region is a continuous sliding operation in the preset image region and, if yes, to judge that the sliding contact operation meets the preset control trigger condition.

In some embodiments, the processor is further configured to judge whether the sliding contact operation in the preset image region is an operation of sliding the interactive sliding icon in the preset image region in a sliding path region included in the preset image region and, if yes, to judge that the sliding contact operation meets the preset control trigger condition.

In some embodiments, the processor is further configured to judge whether the sliding contact operation in the preset image region is an operation of moving the interactive sliding icon included in the preset image region in a sliding path region included in the preset image region along a predefined direction and, if yes, to judge that the sliding contact operation meets the preset control trigger condition.

In some embodiments, the processor is further configured to judge whether the sliding contact operation in the preset image region is an operation of moving the interactive sliding icon included in the preset image region in a sliding path region included in the preset image region by a moving distance, with a ratio of the moving distance to a length of the sliding path region reaching a preset ratio threshold, and, if yes, to judge that the sliding contact operation meets the preset control trigger condition.

In some embodiments, the processor is further configured to display the preset image region when a display instruction related to the preset image region is received.

In some embodiments, the processor is further configured to receive the display instruction related to the preset image region and the display instruction comprises an instruction for requesting the moving object to move, an instruction for requesting the moving object to stop, or an instruction for requesting the moving object to return to a preset position point.

In some embodiments, the processor is further configured to receive the display instruction related to the preset image region. The display instruction comprises an instruction for requesting the moving object to take off, an instruction for requesting the moving object to land, or an instruction for requesting the moving object to return to a preset point of return.

In some embodiments, the processor is further configured to control to start a self-checking process for the moving object if the detected contact operation is the sliding contact operation in the preset image region and stop detecting whether the sliding contact operation is the control trigger operation if error information detected by the moving object is received.

In some embodiments, the processor is further configured to display information on progress of the self-checking process according to information associated with the sliding contact operation in the preset image region.

In some embodiments, the information associated with the sliding contact operation in the preset image region comprises at least one of information on a duration of a sliding in the preset image region or information on a moving distance.

In some embodiments, the processor is further configured to control to stop the self-checking process for the moving object if it is detected that the sliding contact operation is not the control trigger operation.

In another aspect, the present disclosure provides a mobile apparatus comprising a touch display configured to display a user interactive interface comprising an image region configured to trigger a control of a moving object, a receiver configured to receive a contact operation on the user interactive interface, and a processor configured to detect the contact operation on the touch display, detect, if the contact operation is a sliding contact operation in a preset image region, whether the sliding contact operation is a control trigger operation for the moving object, and generate, if the sliding contact operation is the control trigger operation, a control instruction for the moving object.

According to embodiments of the present disclosure, the user may be required to perform a sliding contact operation in the preset image region, which is more complicated than a click on an icon, to carry out the control for a target moving object. As such, it is less likely to cause a misoperation. In addition, it is not difficult for the user to operate because the sliding contact operation is perceptual intuitive and is merely a little more complicated than a clicking operation on an icon. Therefore, the user would not be affected while a misoperation is avoided. It is easy to use and operate.

The present disclosure will be further explained in the following embodiments in conjunction with the drawings.

DETAILED DESCRIPTION OF THE EMBODIMENTS

The technical solution of the present disclosure will be described in detail below with reference to the embodiments of the disclosure in combination with the drawings. It should be appreciated that the embodiments described herein are only some rather than all of the embodiments of the present disclosure. All other embodiments obtained by those skilled in the art on the basis of the embodiments of the present disclosure without any inventive efforts should fall within the scope of the present disclosure.

The embodiments of the present disclosure may be implemented in a smart mobile apparatus with a touch screen. Before a control, instruction for a moving object such as a UAV, remote control car, or a remote control robot is generated, a series of detections and judgements may be made with respect to a related contact operation, to decide whether the control instruction may be generated to control the moving object. A user does not need to perform complicated operations, and the occurrence of a misoperation is more likely to be avoided.

Figure 1:
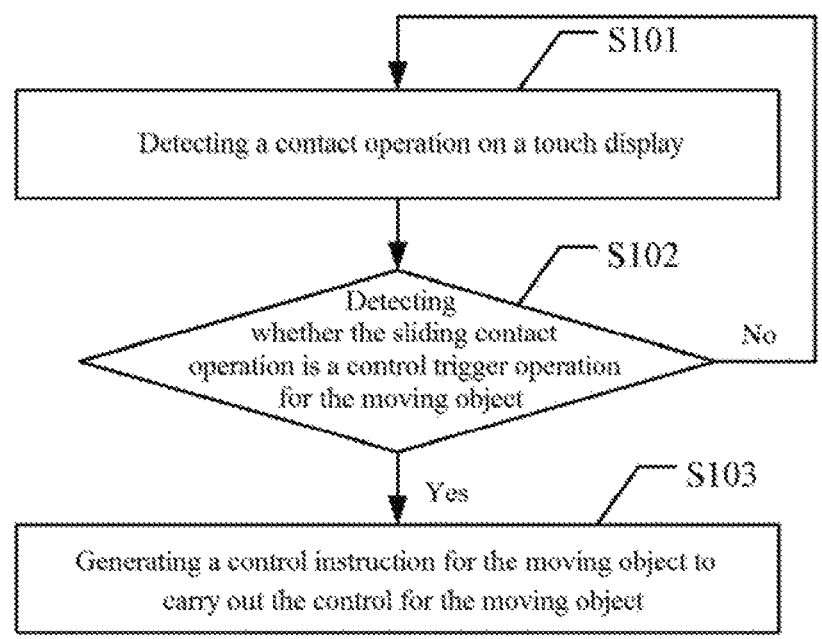
FIG. 1 is a flow chart of a method for controlling a moving object according to an embodiment of the present disclosure.

In particular, FIG. 1 shows a flow chart of a method for controlling a moving object according to an embodiment of the present disclosure. The method can be implemented in a smart mobile apparatus with a remote control function such as a smartphone, a tablet computer, or a smart wearable apparatus. The method shown in FIG. 1 is described in more detail below.

S101: detecting a contact operation on a touch display.

A contact operation event on a touch screen of the mobile apparatus may be detected using an existing method. In some embodiments of the present disclosure, the contact operation by an object, such as a user's finger, on the touch display may be detected in real-time.

In some embodiments, the detection of the contact operation may be performed when a preset trigger event is detected. For example, the detect on the contact operation on the touch display can be performed when a click by the user on a control button for starting to move is detected.

S102: if the detected contact operation is a sliding contact operation in a preset image region, detecting whether the sliding contact operation is a control trigger operation for the moving object.

In some embodiments of the present disclosure, the image region may be preset in a human-machine interactive interface displayed on the mobile apparatus for controlling the moving object. A function of the image region may be to prompt the user to perform the sliding contact operation so as to judge a real control intention of the user.

In general, the image region may be hidden. When the user triggers a remote control event, the image region may be displayed. For example, the image region may be displayed when the user clicks on the control button for starting to move. In some embodiments, the preset image region may also be an interactive interface displayed when triggered, i.e., a region that can be displayed only after the user clicks on the control button for starting to move.

In some embodiments, the above-mentioned remote control event may specifically comprise an instruction for requesting the moving object to move, an instruction for requesting the moving object to stop, or an instruction for requesting the moving object to return to a preset position point. In particular for a UAV, the remote control event may comprise an instruction for requesting the UAV to take of an instruction for requesting the UAV to land, or an instruction for requesting the UAV to return to a preset point of return.

Figure 2:
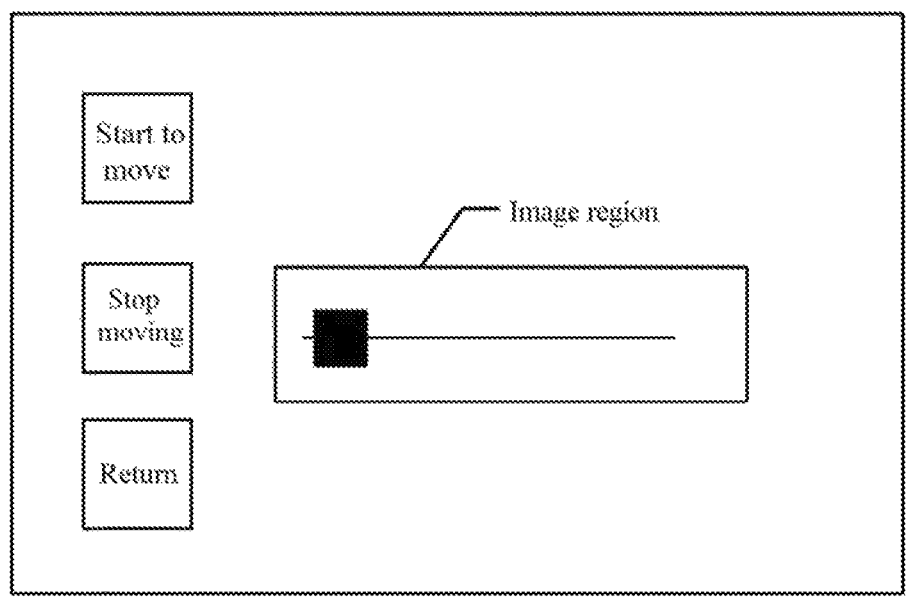
FIG. 2 is a schematic diagram of a human-machine interactive interface involved in an embodiment of the present disclosure.

The image region may specifically be a human-machine interactive interface. The image region may include a sliding indication region for indicating a sliding path and an interactive sliding icon configured to move dynamically in the sliding indication region. FIG. 2 shows an exemplary user interactive interface consistent with embodiments of the present disclosure.

The detection of whether the sliding contact operation is a control trigger operation for the moving object may specifically comprise detecting whether a sliding duration, a sliding path, a sliding direction, and/or a sliding trajectory and so on of the sliding contact operation by the user meet corresponding requirements associated with the duration, path, direction and/or trajectory. If yes, it is determined that the sliding contact operation is the control trigger operation for the moving object.

S103: if yes, generating a control instruction for the moving object to carry out the control for the moving object.

If the sliding contact operation is the control trigger operation for the moving object, a corresponding control instruction may be generated. In some embodiments, different control instructions may be generated according to the length of the sliding duration, the length of the sliding path, different sliding directions, and/or different sliding trajectories. For example, the control instruction for starting to move or take off is generated when the sliding contact operation comprises sliding upward for a certain displacement distance.

The control instruction may also be generated based on the current moving state of the moving object. For example, if the moving object is currently in a stationary state, the moving object may be triggered to move (for example, the UAV may be triggered to take off) after the sliding operation slides to a certain displacement distance. If the moving object is currently in a moving state, the moving object may be triggered to stop moving (for example, the UAV may be triggered to land) after the sliding operation slides to a certain displacement distance.

According to the embodiments of the present disclosure, the user may be required to perform a sliding contact operation in the preset image region, which is more complicated than a click on an icon, to carry out the control for a target moving object. As such, it is less likely to cause a misoperation. In addition, it is not difficult for the user to operate because the sliding contact operation is perceptual intuitive and is merely a little more complicated than a clicking operation on an icon. Therefore, the user would not be affected while a misoperation is avoided. It is easy to use and operate.

Figure 3:
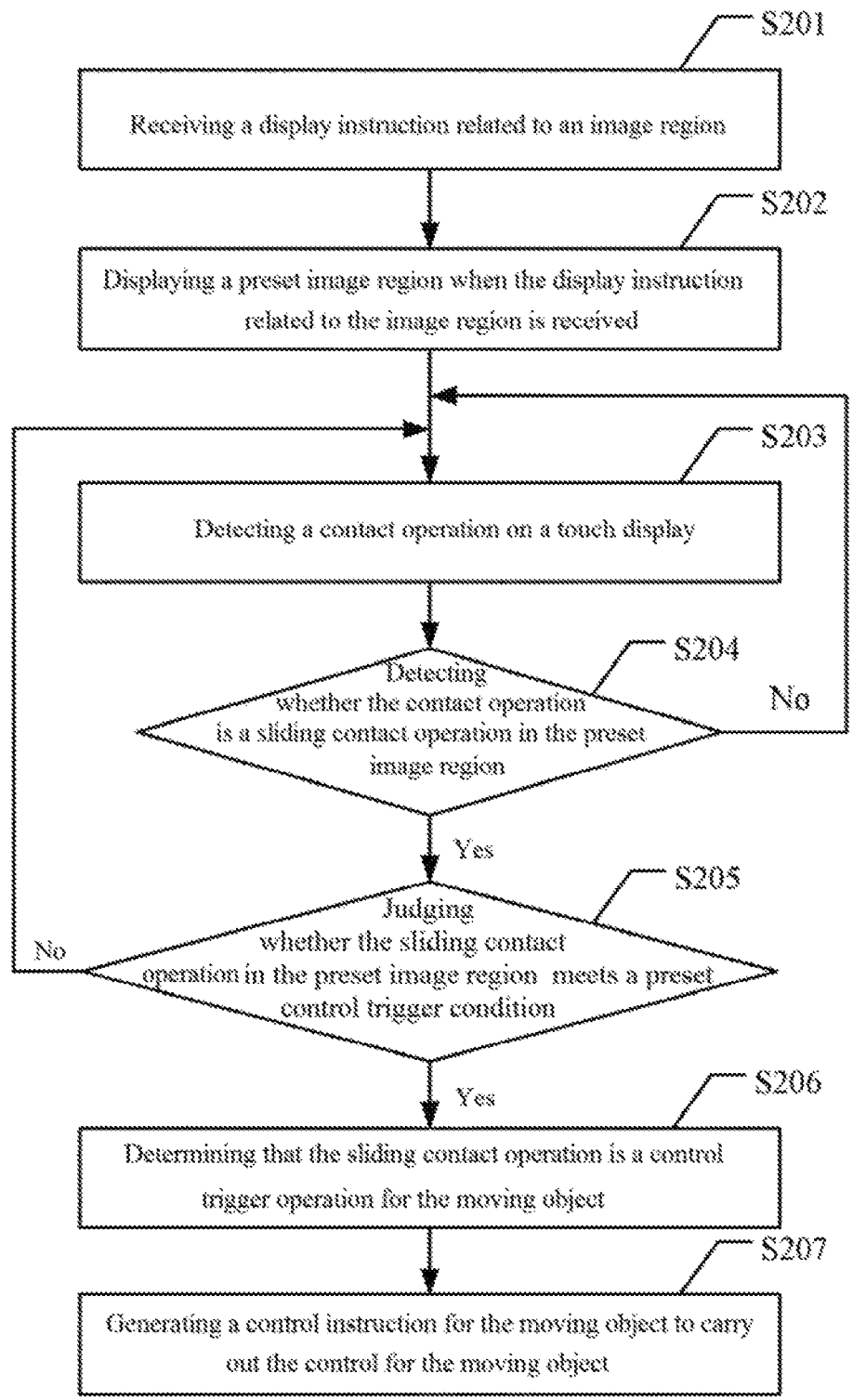
FIG. 3 is a flow chart of a method for controlling a moving object according to another embodiment of the present disclosure.

FIG. 3 shows a flow chart of a method for controlling a moving object according to another embodiment of the present disclosure. The method may be implemented in a smart mobile apparatus with a remote control function such as a smartphone, a tablet computer, or a smart wearable apparatus. The method shown in FIG. 3 is described in more detail below.

S201: receiving a display instruction related to an image region.

In some embodiments of the present disclosure, an integral interactive control interface may be included in a control application installed and configured in a mobile terminal. In the control interactive interface, the moving control for the moving object, the display of various states of the moving object, the control for a load (for example, a camera and so on) carried on the moving object, and the display of information related to the load (for example, a captured image) may be implemented.

In some embodiments, the received display instruction may be an instruction triggered after a user clicks on a certain icon. A specific display instruction may comprise an instruction for requesting the moving object to move that is generated after an con for starting to move is clicked on, an instruction for requesting the moving object to stop that is generated after an icon for stopping moving is clicked on, or an instruction for requesting the moving object to return to a preset position point that is generated after a return icon is clicked on.

In particular for a UAV, the display instruction may comprise an instruction for requesting the UAV to take off that is generated after a taking-off icon is clicked on, an instruction for requesting the UAV to land that is generated after a landing icon is clicked on, or an instruction for requesting the UAV to return to a preset point of return that is generated after a return icon is clicked on.

S202: displaying a preset image region when the display instruction related to the image region is received.

The image region may be a human-machine interactive interface. The image region may include a sliding indication region for indicating a sliding path and an interactive sliding icon configured to move dynamically in the sliding indication region. When the display instruction mentioned above is received, the preset image region is displayed. As shown in FIG. 2, the sliding indication region and the corresponding interactive sliding icon will be displayed after any one of three icon buttons arranged vertically in FIG. 2 is clicked on.

S203: detecting a contact operation on a touch display.

S204 detecting whether the contact operation is a sliding contact operation in the preset image region.

The user may need to perform the sliding contact operation in the preset image region, otherwise the operation is invalid. In some embodiments of the present disclosure, detecting whether the contact operation is the sliding contact operation in the preset image region may mainly comprise detecting whether the user performs an operation of contacting the interactive sliding icon and sliding the interactive sliding icon in the indicated sliding path. If yes, the operation in S205 may be performed. Otherwise the process returns to S203 or ends directly.

S205: judging whether the sliding, contact operation in the preset image region meets a preset control trigger condition, if yes, the operation in S206 is performed. Otherwise the process returns to S203.

In some embodiments, judging whether the sliding contact operation in the preset image region meets the preset control trigger condition may comprise judging whether the sliding contact operation in the preset image region is a continuous sliding operation in the preset image region. If yes, the sliding contact operation meets the preset control trigger condition.

In some embodiments, judging whether the sliding contact operation in the preset image region meets the preset control trigger condition may comprise judging whether the sliding contact operation in the preset image region is an operation of sliding the interactive sliding icon included in the preset image region in the sliding path region included in the preset image region. If yes, the sliding contact operation meets the preset control trigger condition.

In some embodiments, judging whether the sliding contact operation in the preset image region meets the preset control trigger condition may comprise judging whether the sliding contact operation in the preset image region is an operation of moving the interactive sliding icon included in the preset image region along a predefined direction in the sliding path region included in the preset image region. If yes, the sliding contact operation meets the preset control trigger condition.

In some embodiments, judging whether the sliding contact operation in the preset image region meets the preset control trigger condition may comprise judging whether the sliding contact operation in the preset image region is an operation of moving the interactive sliding icon included in the preset image region in the sliding path region included in the preset image region by a moving distance, with a ratio of the moving distance to a length of the sliding path region reaching a preset ratio threshold. If yes, the sliding contact operation meets the preset control trigger condition.

S206: determining that the sliding contact operation is a control trigger operation for the moving object if the sliding contact operation meets the control trigger condition.

S207: generating a control instruction for the moving object to carry out the control for the moving object.

In some embodiments, the control instruction may be related to the display instruction received in the operation of S201. If the received display instruction is related to starting to move, a control instruction for starting to move may be generated. If the received display instruction is related to stopping moving, a control instruction for stopping moving may be generated. Control instructions related to taking off, landing, returning to a point of return, and so on may be generated in similar manners.

According to the embodiments of the present disclosure, the user may be required to perform a sliding contact operation in the preset image region, which is more complicated than a click on an icon, to carry out the control for a target moving object. As such, it is less likely to cause as misoperation. In addition, it is not difficult for the user to operate because the sliding contact operation is perceptual intuitive and is merely a little more complicated than a clicking operation on an icon. Therefore, the user would not be affected while a misoperation is avoided. It is easy to use and operate.

Figure 4:
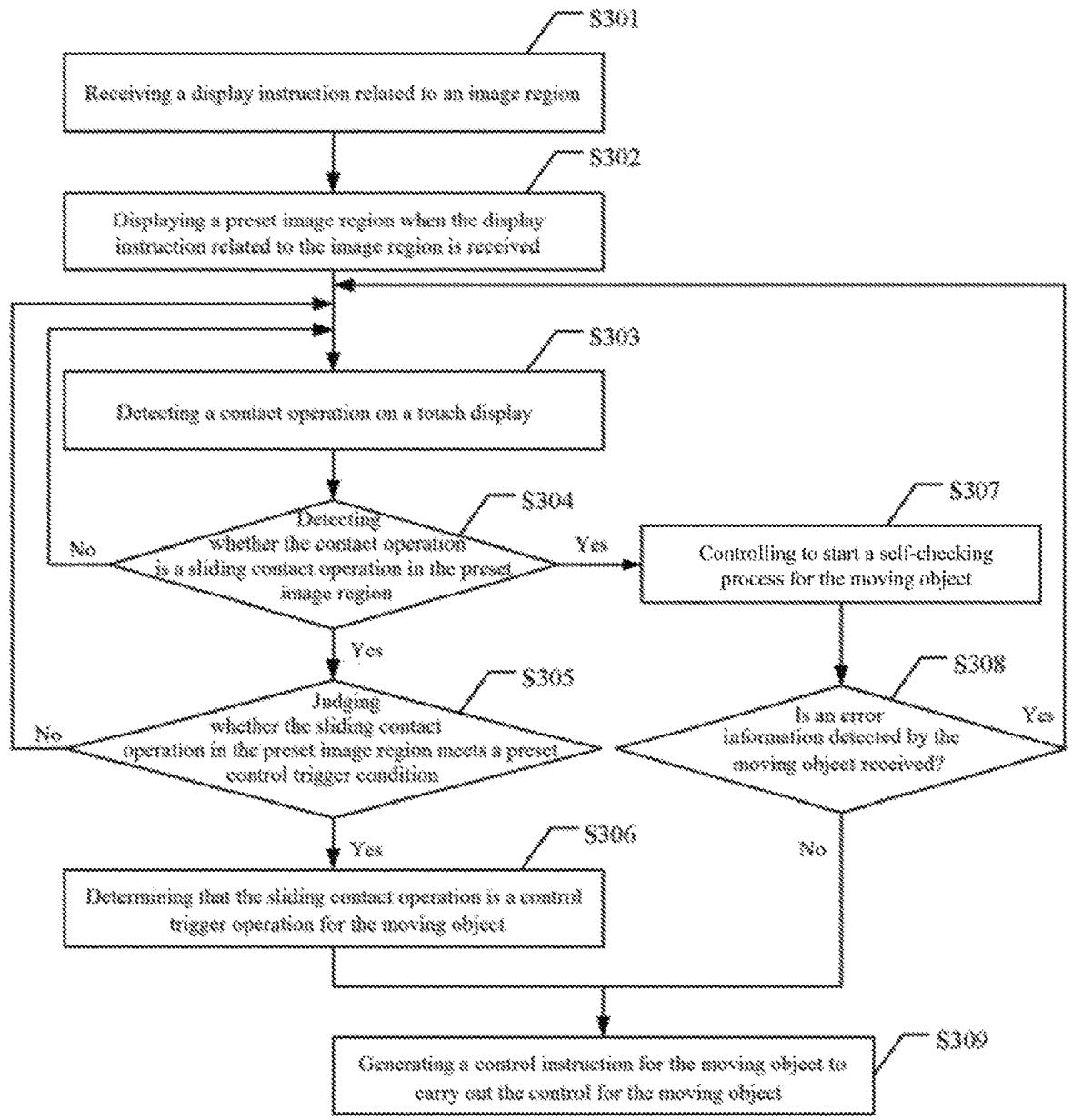
FIG. 4 is, a flow chart of a method for controlling a moving object according to another embodiment of the present disclosure.

FIG. 4 shows a flow chart of a method for controlling a moving object according to another embodiment of the present disclosure. The method may be implemented in a smart mobile apparatus with a remote control function such as a smartphone, a tablet computer, or a smart wearable apparatus. The method shown in FIG. 4 is described in more detail below.

S301: receiving a display instruction related to an image region.

In some embodiments of the present disclosure, an integral control interactive interface may be included in a control application installed and configured in a mobile terminal. In the control interactive interface, the moving control for the moving object, the display of various states of the moving object, and the control for a load (for example, a camera and so on) carried on the moving object, and the display of information related to the load (for example, a captured image) may be implemented.

In some embodiments, the received display instruction may be an instruction triggered after a user clicks on a certain icon. A specific display instruction may comprise an instruction for requesting the moving object to move that is generated after an icon for starting to move is clicked on, an instruction for requesting the moving object to stop that is generated after an icon for stopping moving is clicked on, or an instruction for requesting the moving object to return to a preset position point that is generated after a return icon is clicked on.

In particular for a UAV, the display instruction may comprise an instruction for requesting the UAV to take off that is generated after a taking-off icon is clicked on, an instruction for requesting the UAV to land that is generated after a landing icon is clicked on, or an instruction tor requesting the UAV to return to a preset point of return that is generated after a return icon is clicked on.

S302: displaying a preset image region when the display instruction related to the image region is received.

The image region may be a human-machine interactive interface. The image region may include a sliding indication region for indicating a sliding path and an interactive sliding icon configured to move dynamically in the sliding indication region. When the display instruction mentioned above is received, the preset image region is displayed. As shown FIG. 2, the sliding indication region and the corresponding interactive sliding icon will be displayed after any one of three icon buttons arranged vertically in FIG. 2 is clicked on.

S303: detecting a contact operation on a touch, display.

S304: detecting whether the contact operation is a sliding contact operation in the preset image region.

The user may need to perform the sliding contact operation in the preset image region, otherwise the operation is invalid. In some embodiments of die present disclosure, detecting whether the contact operation is the sliding contact operation in the preset image region may mainly comprise detecting whether the user performs an operation of contacting the interactive sliding icon and sliding the interactive sliding icon in the indicated sliding path. If yes, the operations in S305 and S307 may be performed. Otherwise the process returns to S303 or ends directly.

S305: judging whether the sliding contact operation in the preset image region meets a preset control trigger condition;

If yes, the operation in S306 is performed. Otherwise the process returns to S303 and the execution of the operation in S307 is controlled to be terminated.

In some embodiments, judging whether the sliding contact operation in the preset image region meets the preset control trigger condition may comprise judging whether the sliding contact operation in the preset image region is a continuous sliding operation in the preset image region. If yes, the sliding contact operation meets the preset control trigger condition.

In some embodiments, judging whether the sliding contact operation in the preset image region meets the preset control trigger condition may comprise judging whether the sliding contact operation in the preset image region is an operation of sliding the interactive sliding icon included in the preset image region in the sliding path region included in the preset image region. If yes, the sliding contact operation meets the preset control trigger condition.

In some embodiments, judging whether the sliding contact operation in the preset image region meets the preset control trigger condition may comprise judging whether the sliding contact operation in the preset image region is an operation of moving the interactive sliding icon included in the preset image region along a predefined direction in the sliding path region included in the preset image region. If yes, the sliding contact operation meets the preset control trigger condition.

In some embodiments, judging whether the sliding contact operation in the preset image region meets the preset control trigger condition may comprise judging whether the sliding contact operation in the preset image region is an operation of moving the interactive sliding icon included in the preset image region in the sliding path region included in the preset image region by a moving distance, with a ratio of the moving distance to a length of the sliding path region reaching a preset ratio threshold. If yes, the sliding contact operation meets the preset control trigger condition.

S306: determining that the sliding contact operation is a control trigger operation for the moving object if the sliding contact operation meets the control trigger condition.

S307: controlling to start a self-checking process for the moving object if the detected contact operation is the sliding contact operation in the preset image region.

S308: judging whether error information detected by the moving object is received. The moving object may return a self-checking result to the client terminal in real-time after being triggered to perform the self-checking process, such that the client terminal can inform the user.

In some embodiments, if the error information detected by the moving object is received, the detection of whether the sliding contact operation is the control trigger operation stops.

According to some embodiments of the present disclosure, if the contact operation is detected to be the sliding contact operation in the preset image region, the self-checking process for the moving object is controlled to start while the operation in S305 is performed. The self-checking process may comprise checking various functional modules of the moving object, such as a positioning module, a power module, a battery level, and so on. In some embodiments, a self-checking process may be performed as needed. The functional modules may be one or more specified modules affecting the operation of the moving object. For example, the battery level may be too low to allow the UAV to fly, etc.

Once one or more pieces of error information affecting the operation are detected, the detection of whether the sliding contact operation is the control trigger operation is stopped, i.e., the operation in S305 is controlled to stop and an alarm prompt may be sent out. The process returns to S303.

In some embodiments, after the self-checking process for the moving object is started, when the user performs the sliding operation in the preset image, the progress of the self-checking process may be displayed according to information associated with the sliding contact operation in the preset image region. The information associated with the sliding contact operation in the preset image region may comprise information on a duration of a sliding of the sliding contact operation in the preset image region and/or information on a moving distance of the sliding contact operation.

If it is detected that the sliding contact operation is not the control trigger operation, the self-checking process for the moving object is controlled to stop.

In the judging process of S305, if it is determined that the sliding contact operation is not the control trigger operation, likewise the process may end or return to S303.

If no error information is received, or prompt information of successful self-checking is received, and the judging result of S305 is true, then the process proceeds to S309.

S309: generating a control instruction for the moving object to carry out the control for the moving object.

In some embodiments, the control instruction may be related to the display instruction received in the operation of S301. If the received display instruction is related to starting to move, a control instruction for starting to move may be generated. If the received display instruction is related to stopping moving, a control instruction for stopping moving may be generated. Control instructions related to taking off, landing, returning to a point of return, and so on may be generated in similar manners.

According to the embodiments of the present disclosure, the user may be required to perform a sliding contact operation in the preset image region, which is more complicated than a click on an icon, to carry out the control for a target moving object. As such, it is less likely to cause a misoperation. In addition, it is not difficult for the user to operate because the sliding contact operation is perceptual intuitive and is merely a little more complicated than a clicking operation on an icon. Therefore, the user would not be affected while a misoperation is avoided. It is easy to use and operate.

Devices for controlling a moving object and mobile apparatuses according to exemplary embodiments of the present disclosure are described in detail below.

Figure 5:
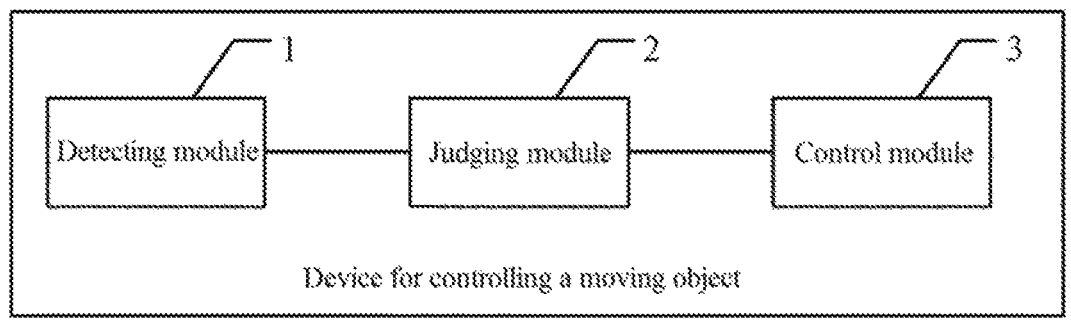
FIG. 5 is a structural schematic diagram of a device for controlling a moving object according to an embodiment of the present disclosure.

FIG. 5 shows a structural schematic diagram of a device for controlling a moving object according to an embodiment of the present disclosure. The device according may be arranged in a mobile apparatus such as a smartphone, a tablet computer, a smart wearable apparatus, or the like. As shown in FIG. 5, the device may comprise a detecting module 1 configured to detect a contact operation on a touch display, a judging module 2 configured to, if the detected contact operation is a sliding contact operation in a preset image region, detect whether the sliding contact operation is a control trigger operation for the moving object, and a control module 3 configured to, when the judging result of the judging module 2 is yes, generate a control instruction for the moving object to carry out the control for the moving object.

A contact operation event on a touch screen may be detected by the detecting module according to an existing method. In some embodiments of the present disclosure, the detecting module 1 may detect the contact operation by an object, such as a user's finger, on the touch display in real time.

In some embodiments, the detecting module 1 may perform the detection for the contact operation when a preset trigger event is detected. For example, the detecting module 1 may detect the contact operation on the touch display when it is detected that the user clicks on a control button for starting to move.

In some embodiments of the present disclosure, the image region may be preset in a human-machine interactive interface displayed on the mobile apparatus for controlling the moving object. The function of the image region may be to prompt the user to perform the sliding contact operation so as to judge the real control intention of the user. In some embodiments, the image region may include a sliding indication region for indicating a sliding path and an interactive sliding icon configured to move dynamically in the sliding indication region.

In general, the image region may be hidden. When the user triggers a remote control event, the image region may be displayed. For example, the image region may be displayed when the user clicks on the control button for starting to move. In some embodiments, the preset image region may also be an interactive interface displayed when triggered, i.e., a region that can be displayed only after the user clicks on the control button for starting to move.

In some embodiments, the above-mentioned remote control event may specifically comprise an instruction for requesting the moving object to move, an instruction for requesting the moving object to stop, or an instruction for requesting the moving object to return to a preset position point. In particular for a UAV, the remote control event may comprise an instruction for requesting the UAV to take off, an instruction for requesting the UAV to land, or an instruction for requesting the UAV to return to a preset point of return.

The image region may specifically be a human-machine interactive interface. The image region may include a sliding indication region for indicating a sliding path and an interactive sliding icon configured to move dynamically in the sliding indication region. FIG. 2 shows an exemplary user interactive interface consistent with embodiments of the present disclosure.

The judging module 2 configured to detect whether the sliding contact operation is a control trigger operation for the moving object may be specifically configured to detect whether a sliding duration, a sliding path, a sliding, direction, and/or a sliding trajectory and so on of the sliding contact operation by the user meet requirements associated with the duration, the path, the direction and/or the trajectory, and, if yes, to determine that the sliding contact operation is the control trigger operation for the moving object.

The control module 3 may be configured to, if the sliding contact operation is the control trigger operation for the moving object, generate a corresponding control instruction. In some embodiments, different control instructions may be generated according to the length of the sliding duration, the length of the sliding path, different sliding directions, and/or different sliding trajectories. For example, the control instruction for starting to move or take off is generated when the sliding contact operation comprises sliding upward for a certain displacement distance.

The control instruction may also be generated based on the current moving state of the moving object. For example, if the moving object is currently in a stationary state, the moving object may be triggered to move (for example, the UAV may be triggered to take off) after the sliding operation slides to a certain displacement distance. If the moving object is currently in a moving state, the moving object may be triggered to stop moving (for example, the UAV may be triggered to land) after the sliding operation slides to a certain displacement distance.

According to the embodiments of the present disclosure, the user may be required to perform a sliding contact operation in the preset image region, which is more complicated than a click on an icon, to carry out the control for a target 1 loving object. As such, it is less likely to cause a misoperation. In addition, it is not difficult for the user to operate because the sliding contact operation is perceptual intuitive and is merely a little more complicated than a clicking operation on an icon. Therefore, the user would not be affected while a misoperation is avoided. It is easy to use and operate.

Figure 6:
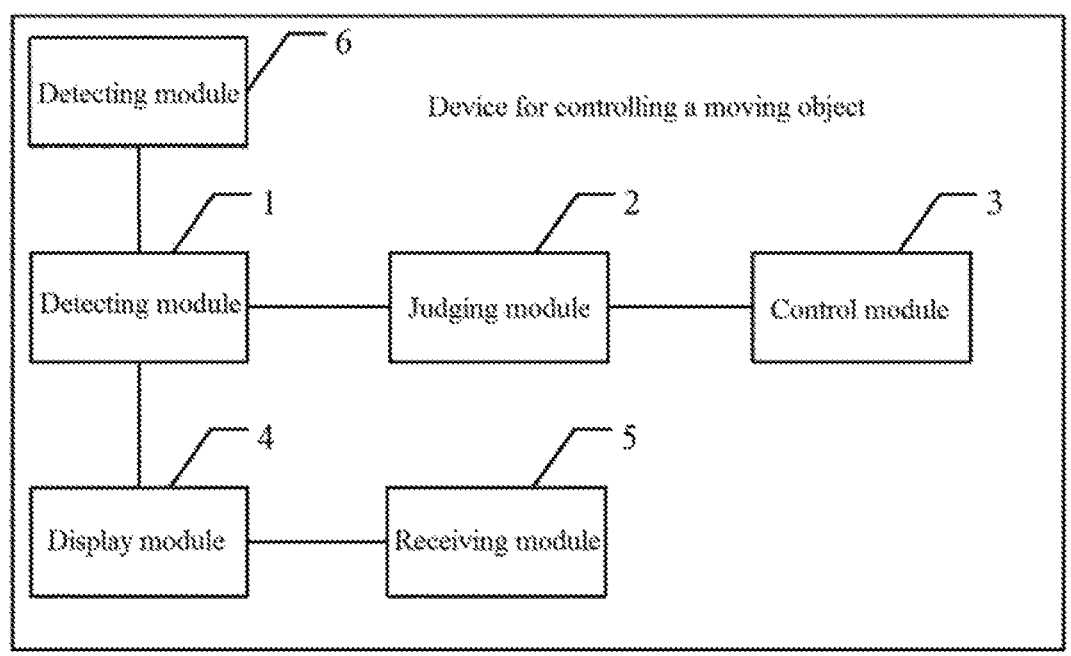
FIG. 6 is a structural schematic diagram of a device for controlling a moving object according to another embodiment of the present disclosure.

FIG. 6 shows a structural schematic diagram of a device for controlling a moving object according to another embodiment of the present disclosure. The device may be arranged in a mobile apparatus such as a smartphone, a tablet computer, a smart wearable apparatus, or the like. As shown in FIG. 6, the device may comprise the above-described detecting module 1, judging module 2, and control module 3. Further, as shown in FIG. 6, the device may further comprise a display module 4 configured to display the preset image region when a display instruction related to an image region is received.

The display module may control the display of the above-described image region in a display screen.

Figure 7:
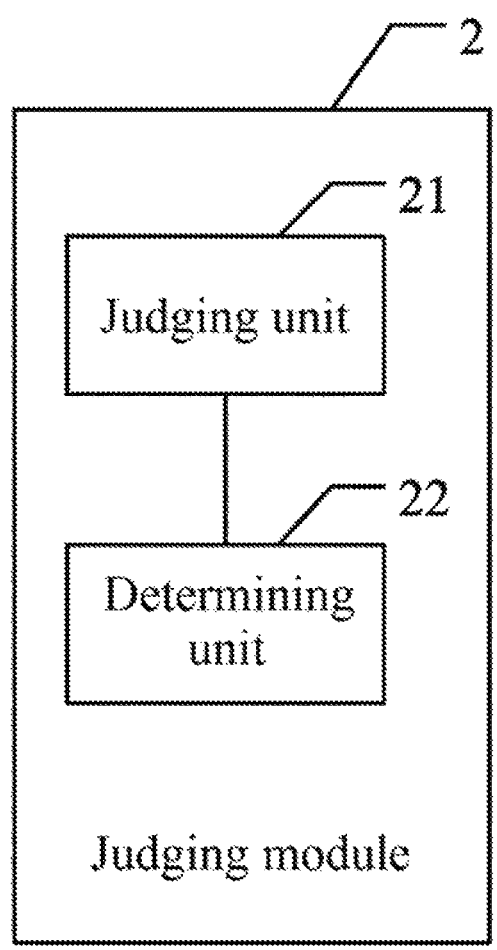
FIG. 7 is a structural schematic diagram of a judging module as shown in the FIG. 6.

In some embodiments, as shown in FIG. 7, the judging module 2 may specifically comprise a judging unit 21 configured to judge whether the sliding contact operation in the preset image region meets a preset control trigger condition, and a determining unit 22 configured to determine that the sliding contact operation is the control trigger operation for the moving object when the judging result of the judging unit 21 is that the sliding contact operation meets the control trigger condition.

In some embodiments, the judging unit 21 may be specifically configured to judge whether the sliding contact operation in the preset image region is a continuous sliding operation in the preset image region, and, if yes, to judge that the sliding contact operation meets the preset control trigger condition.

In some embodiments, the judging unit 21 may be specifically configured to judge whether the sliding contact operation in the preset image region is an operation of sliding the interactive sliding icon included in the preset image region in the sliding path region included in the preset image region, and, if yes, to judge that the sliding contact operation meets the preset control trigger condition.

In some embodiments, the judging unit 21 may be specifically configured to judge whether the sliding contact operation in the preset image region is an operation of moving the interactive sliding icon included in the preset image region in the sliding path region included in the preset image region along a predefined direction, and, if yes, to judge that the sliding contact operation meets the control trigger condition.

In some embodiments, the judging unit 21 may be specifically configured to judge whether the sliding contact operation in the preset image region is an operation of moving the interactive sliding icon included in the preset image region in the sliding path region included in the preset image region by a moving distance, with a ratio of the moving distance to a length of the sliding path region reaching a preset ratio threshold, and, if yes, to judge that the sliding contact operation meets the preset control trigger condition.

It is noted that the judging unit 21 may select any one or any combination of the above discussed four judging manners as needed to meet different requirements.

Further, in some embodiments of the present disclosure, as shown in FIG. 6, the device may also comprise a receiving module 5 configured to receive the display instruction related to the image region. The display instruction may comprise an instruction for requesting the moving object to move, an instruction for requesting the moving object to stop, or an instruction for requesting the moving object to return to a preset position point.

Particularly, if the device is used to control the UAV, the receiving module 5 may specifically be configured to receive a display instruction related to the image region that may comprise an instruction for requesting the UAV to take off, an instruction for requesting the UAV to land, or an instruction for requesting the UAV to return to a preset point of return.

In some embodiments of the present disclosure, as shown in FIG. 6, the device may also comprise a self-checking module 6 configured to control to start a self-checking process for the moving object if the detected contact operation is the sliding contact operation in the preset image region, or to notify to stop the detection of whether the sliding contact operation is the control trigger operation if error information detected by the moving object is received.

In some embodiments, the self-checking module 6 may be further configured to control to display information on the progress of the self-checking process according to information associated with the sliding contact operation in the preset image region.

In some embodiments, the judging module 2 may be further configured to control to stop the self-checking process for the moving object if it is detected that the sliding contact operation is not the control trigger operation.

It is noted that, in some embodiments of the present disclosure, specific implementations of individual modules and units may be similar to the exemplary processes described above with reference to FIGS. 1 to 4.

According to the embodiments of the present disclosure, the user may be required to perform a sliding contact operation in the preset image region, which is more complicated than a click on an icon, to carry out the control for a target moving object. As such, it is less likely to cause a misoperation. In addition, it is not difficult for the user to operate because the sliding contact operation is perceptual intuitive and is merely a little more complicated than a clicking operation on a icon. Therefore, the user would not be affected while a misoperation is avoided. It is easy to use and operate.

Figure 8:
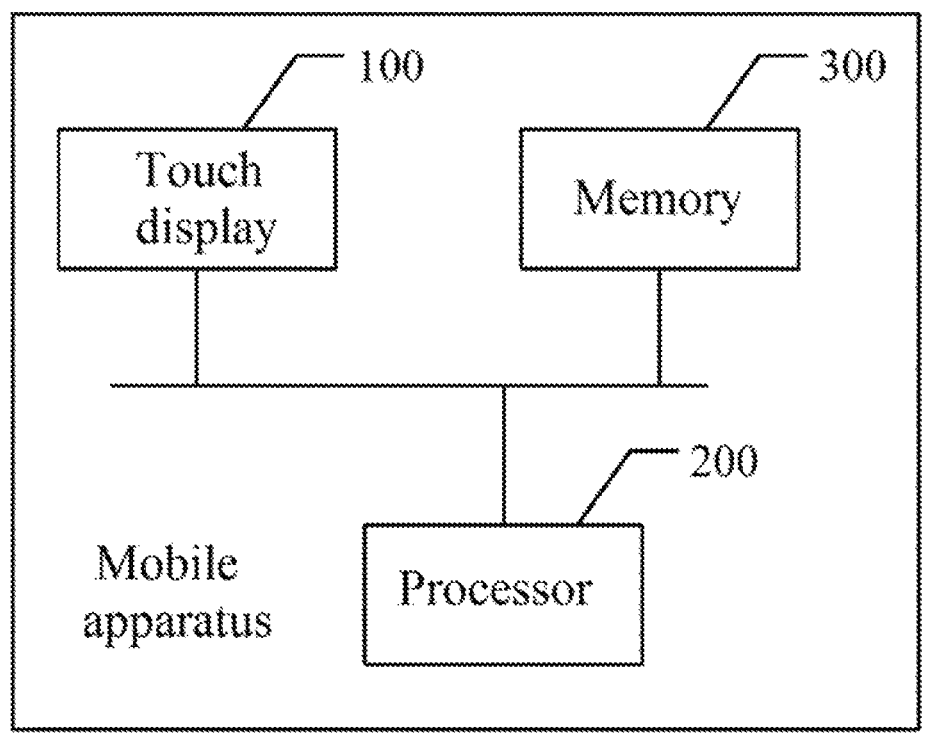
FIG. 8 is a structural schematic diagram of a mobile apparatus according to an embodiment of the present disclosure.

FIG. 8 shows a structural schematic diagram of a mobile apparatus according to an embodiment of the present disclosure. The mobile apparatus may comprise existing structures such as a power supply module, a memory 300, and a data bus. As shown in FIG. 8, the mobile apparatus may further comprise a touch display 100 and a processor 200. A processing application program for controlling a moving object may be stored in the memory 300. The processor 200 according to an embodiment of the present disclosure may be configured to perform corresponding functions by calling the processing application program for controlling the moving object.

The processor 200 may be configured to detect a contact operation on the touch display 100, and, if the detected contact operation is a sliding contact operation in a preset image region, to detect whether the sliding contact operation is a control trigger operation for the moving object, and, if yes, to generate a control instruction for the moving object to carry out the control for the moving object.

In some embodiments, the image region may be a human-machine interactive interface. The image region may include a sliding indication region for indicating a sliding path and an interactive sliding icon configured to move dynamically in the sliding indication region.

In some embodiments, the processor 200 may be further configured to display the preset image region when a display instruction related to the image region is received.

In some embodiments, the processor 200 may specifically be configured to judge whether the sliding contact operation in the preset image region meets a preset control trigger condition, and, if yes, to determine that the sliding contact operation is the control trigger operation for the moving object.

In some embodiments, the processor 200 may specifically be configured to judge whether the sliding contact operation in the preset image region is a continuous sliding operation in the preset image region, and, if yes, to judge that the sliding contact operation meets the preset control trigger condition.

In some embodiments, the processor 200 may specifically be configured to judge whether the sliding contact operation in the preset image region is an operation of sliding the interactive sliding icon included in the preset image region in the sliding path region included in the preset image region, and, if yes, to judge that the sliding contact operation meets the preset control trigger condition.

In some embodiments, the processor 200 may specifically be configured to judge whether the sliding contact operation in the preset image region is an operation of moving the interactive sliding icon included in the preset image region in the sliding path region included in the preset image region along a predefined direction, and, if yes, to judge that the sliding contact operation meets the preset control trigger condition.

In some embodiments, the processor 200 may specifically be configured to judge whether the sliding contact operation in the preset image region is an operation of moving the interactive sliding icon included in the preset image region in the sliding path region included in the preset image region by a moving distance, with a ratio of the moving distance to a length of the sliding path region reaching a preset ratio threshold, and, if yes, to judge that the sliding contact operation meets the preset control trigger condition.

In some embodiments, the processor 200 may be further configured to receive a display instruction related to the image region that may comprise an instruction for requesting the moving object to move, or an instruction for requesting the moving object to stop, or an instruction for requesting the moving object to return to a preset position point.

In some embodiments, the processor 200 may be further configured to receive a display instruction related to the image region that may comprise an instruction for requesting the moving object to take off, an instruction for requesting the moving object to land, or an instruction for requesting a moving object to return to a preset point of return.

In some embodiments, the processor 200 may be farther configured to control to start a self-checking process for the moving object if the detected contact operation is the sliding contact operation in the preset image region, and to stop detecting whether the sliding contact operation is the control trigger operation if error information detected by the moving object is received.

In some embodiments, the processor 200 may be further configured to display information on the process of the self-checking process according to information associated with the sliding contact operation in the preset image region.

In some embodiments, the information associated with the sliding contact operation in the preset image region may comprise information on a duration of a sliding of the sliding contact operation in the preset image region and/or information on the moving distance of the sliding contact operation.

In some embodiments, the processor 200 may be further configured to control to stop the self-checking process for the moving object if it is detected that the sliding contact operation is not the control trigger operation.

It is noted that specific implementations of the processor 200 according to embodiments of the present disclosure may be similar to those in the exemplary methods and devices described above with reference to FIGS. 1 to 7.

According to the embodiments of the present disclosure, the user may be required to perform a sliding contact operation in the preset image region, which is more complicated than a click on an icon, to carry out the control for a target moving object. As such, it is less likely to cause a misoperation. In addition, it is not difficult for the user to operate because the sliding contact operation is perceptual intuitive and is merely a little more complicated than a clicking operation on an icon. Therefore, the user would not be affected while a misoperation is avoided. It is easy to use and operate.

Figure 9:
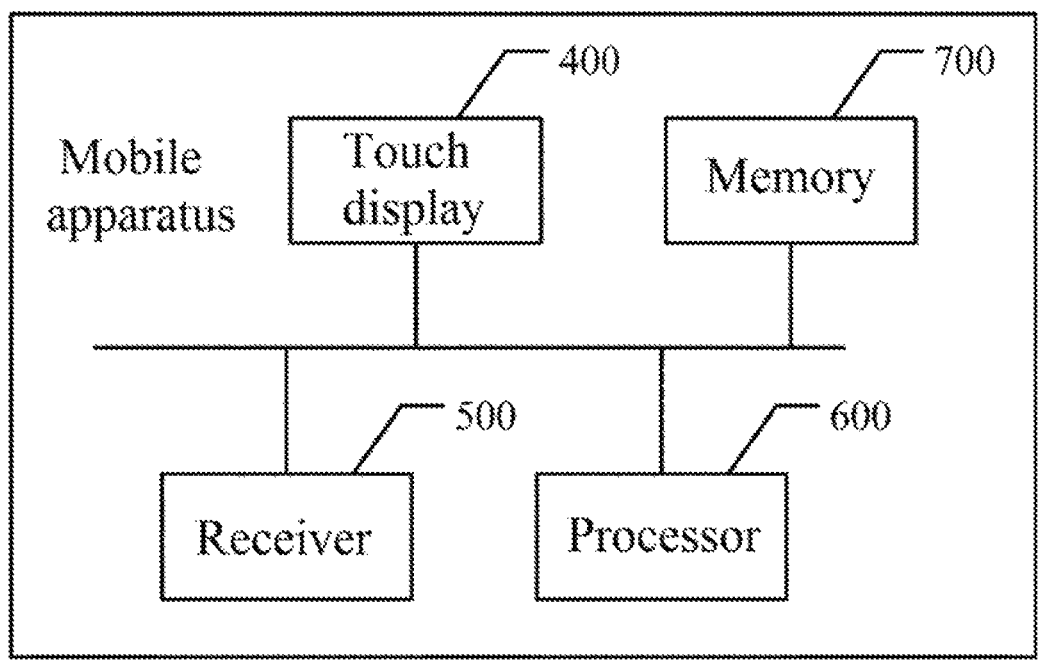
FIG. 9 is a structural schematic diagram of a mobile apparatus according to another embodiment of the present disclosure.

FIG. 9 shows a structural schematic diagram of a mobile apparatus according to another embodiment of the present disclosure, which may comprise existing structures such as a power supply module, a memory 700, and a data bus. As shown in FIG. 9, the mobile apparatus may further comprise a touch display 400, a receiver 500, and a processor 600. A processing application program for controlling a moving, object may be stored in the memory 700. The processor 600 according to embodiments of the present disclosure may perform corresponding functions by calling the processing application program for controlling the moving object.

The touch display 400 may be configured to display a user interactive interface comprising an image region configured to trigger to control the moving object. The receiver 500 may be configured to receive a contact operation on the user interactive interface. The processor 600 may be configured to detect the contact operation on the touch display, and, if the detected contact operation is a sliding contact operation in a preset image region, to detect whether the sliding contact operation is a control trigger operation for the moving object, and, if yes, to generate a control instruction for the moving object so as to carry out the control for the moving object.

It is noted that, the specific implementation of the processor 600 may be similar to those in the exemplary methods and devices described above with reference to FIGS. 1 to 7.

According to the embodiments of the present disclosure, the user may be required to perform a sliding contact operation in the preset image region, which is more complicated than a click on an icon, to carry out the control for a target moving object. As such, it is less likely to cause a misoperation. In addition, it is not difficult for the user to operate because the sliding contact operation is perceptual intuitive and is merely a little more complicated than a clicking operation on an icon. Therefore, the user would not be affected while a misoperation is avoided. It is easy to use and operate.

In various embodiments provided in the present disclosure, it is understood that, the disclosed related devices and methods may be implemented by other manners. For example, the above-described device embodiments are merely schematic. For example, the division of the modules or units is merely a logic function division, and other division manners may be employed in practice. For example, a plurality of units or components may be combined or may be integrated into another system. Alternatively, some features may be omitted or not be performed. Additionally, couplings or direct couplings, or communication connections between one and another as displayed or discussed may be indirect couplings or communication connections via some interfaces, devices or units, and may be in electric, mechanical or other forms.

Units described as separate parts may be or may not be separated physically. Components displayed as units may be or may not be physical units, i.e., they may be located in one place, or may be distributed onto a plurality of network units. Some or all of the units may be selected in order to achieve the objects of the solutions of the embodiments according to the actual requirements.

Additionally, various functional units in various embodiments according to the present disclosure may be integrated into one processing unit, or may be physically individual. Two or more of various function units may be integrated into one unit. The above integrated unit may be implemented in a form of hardware or in a form of functional units of software.

The integrated units if being implemented in a form of functional units of software and being indepstopent products for sale and use may be stored in a computer-readable storage medium. Based on such understandings, some or all of the technical solutions may be embodied in a form or a software product. The computer software product may be stored in a storage medium, and comprise several instructions for causing the computer processor to execute a part of or the entire method consistent with the present disclosure, such as one of the above-described exemplary methods. The above-mentioned storage medium may comprise a medium capable of storing program codes, such as a USB flash disk, a removable hard disk, a Read-Only Memory (ROM), a random access memory (RAM), a diskette, or a compact disc.

The foregoing disclosure is merely illustrative of the embodiments of the disclosure hut not intended to limit the scope of the disclosure. Any equivalent modifications to a structure or workflow, which are made without departing from the specification and the drawings of the disclosure, and a direct or indirect application in other relevant technical fields, shall fall into the scope of the disclosure.

What is claimed is:

1. A method for controlling a moving object, comprising:
   bringing, in response to a preset trigger event being detected, a preset image region from a hidden state to a display state in which the preset image region is provided on a touch display, the trigger event including a click on a control button for starting to move the moving object;
   detecting a contact operation on the touch display in a real-time manner;
   determining whether the contact operation is a sliding contact operation in the preset image region;
   in response to determining the contact operation is a sliding contact operation in the preset image region, determining whether the sliding contact operation is a control trigger operation for the moving object and controlling to start a self-checking process for the moving object;
   stopping determining whether the sliding contact operation is the control trigger operation in response to error information being detected by the self-checking process;

controlling to stop the self-checking process from being completed in response to determining that the sliding contact operation is not the control trigger operation; and generating a control instruction for the moving object in response to no error information being detected after the self-checking process is completed and determining that the sliding contact operation is the control trigger operation.

2. The method according to claim 1, wherein the preset image region is a human machine interactive interface including a sliding indication region configured to indicate a sliding path and an interactive sliding icon configured to move dynamically in the sliding indication region.

3. The method according to claim 2, wherein determining whether the sliding contact operation is the control trigger operation for the moving object comprises:

judging whether the sliding contact operation in the preset image region meets a preset control trigger condition; and determining that the sliding contact operation is the control trigger operation for the moving object if the sliding contact operation meets the preset control trigger condition.

4. The method according to claim 3, wherein judging whether the sliding contact operation in the preset image region meets the preset control trigger condition comprises:

judging whether the sliding contact operation in the preset image region is a continuous sliding operation in the preset image region; and if yes judging that the sliding contact operation meets the preset control trigger condition.

5. The method according to claim 3, wherein judging whether the contact operation in the preset image region at meets the preset control trigger condition comprises:

judging whether the sliding contact operation in the preset image region is an operation of sliding the interactive sliding icon included in the preset image region in a sliding path region included in the preset image region; and if yes, judging that the sliding contact operation meets the preset control trigger condition.

6. The method according to claim 3, wherein judging whether the sliding contact operation in the preset image region meets the preset control trigger condition comprises:

judging whether the sliding contact operation in the preset image region is an operation of moving the interactive sliding icon included in the preset image region in a sliding path region included in the preset image region along a predefined direction; and if yes, judging that the sliding contact operation meets the preset control trigger condition.

7. The method according to claim 3, wherein judging whether the sliding contact operation in the preset image region meets the preset control trigger condition comprises:

judging whether the sliding contact operation in the preset image region is an operation of moving the interactive sliding icon included in the preset image region in a sliding path region included in the preset image region by a moving distance, with a ratio of the moving distance to a length of the sliding path region reaching a preset ratio threshold; and if yes, judging that the sliding contact operation meets the preset control trigger condition.

8. The method according to claim 1, further comprising:

displaying information on progress of the self-checking process according to information associated with the sliding contact operation in the preset image region, wherein the information associated with the sliding contact operation in the preset image region comprises at least one of information on a duration of a sliding in the preset image region or information on a moving distance.

9. A mobile apparatus, comprising:

a touch display; and a processor configured to:

bring, in response to a preset trigger event being detected, a preset image region from a hidden state to a display state in which the preset image region is provided on the touch display, the trigger event including a click on a control button for starting to move a moving object;

detect a contact operation on the touch display in a real-time manner, determine whether the contact operation is a sliding contact operation in the preset image region;

in response to determining the contact operation is a sliding contact operation in the preset image region, determine whether the sliding contact operation is a control trigger operation for the moving object and control to start a self-checking process for the moving object;

stop determining whether the sliding contact operation is the control trigger operation in response to error information being detected by the self-checking process;

control to stop the self-checking process from being completed in response to determining that the sliding contact operation is not the control trigger operation; and generate a control instruction for the moving object in response to no error information being detected after the self-checking process is completed and determining that the sliding contact operation is the control trigger operation.

10. The mobile apparatus according to claim 9, wherein the preset image region is a human-machine interactive interface including a sliding indication region configured to indicate a sliding path and an interactive sliding icon configured to move dynamically in the sliding indication region.

11. The mobile apparatus according to claim 10, wherein the processor is further configured to:

judge whether the sliding contact operation in the preset image region meets a preset control trigger condition, and determine that the sliding contact operation is the control trigger operation for the moving object if the sliding contact operation meets the preset control trigger condition.

12. The mobile apparatus according to claim 11, wherein the processor is further configured to judge whether the sliding contact operation in the preset image region is a continuous sliding operation in the preset image region and, if yes, to judge that the sliding contact operation meets the preset control trigger condition.

13. The mobile apparatus according to claim 11, wherein the processor is further configured to judge whether the sliding contact operation in the preset image region is an operation of sliding the interactive sliding icon in the preset image region in a sliding path region included in the preset image region and, if yes, to judge that the sliding contact operation meets the preset control trigger condition.

14. The mobile apparatus according to claim 11, wherein the processor is further configured to judge whether the sliding contact operation in the preset image region is an operation of involving the interactive sliding icon included in the preset image region in a sliding path region included in the preset image region along a predefined direction and, if yes, to judge that the sliding contact operation meets the preset control trigger condition.

15. The mobile apparatus according to claim 11, wherein the processor is further configured to judge whether the sliding contact operation in the preset image region is an operation of moving the interactive sliding icon included in the preset image region in a sliding path region included in the preset image region by a moving distance, with a ratio of the moving distance to a length of the sliding path region reaching a preset ratio threshold, and, if yes, to judge that the sliding, contact operation meets the preset control trigger condition.

* * * * *